US005128719A

United States Patent [19]

Umeda et al.

[11] Patent Number: 5,128,719

[45] Date of Patent: Jul. 7, 1992

[54] ELECTROSTATIC RECORDING APPARATUS CAPABLE OF PREVENTING ADHESION OF EXCESSIVE TONER

[75] Inventors: Takao Umeda, Mito; Tetsuya Nagata, Hitachi; Tatsuo Igawa, Kitaibaraki; Kimio Nakamura, Katsuta; Shinichi Nishino, Katsuta; Toshitaka Ogawa, Katsuta, all of Japan

[73] Assignees: Hitachi, Ltd., Chiyoda; Hitachi Koki Co., Ltd., Tokyo, both of Japan

[21] Appl. No.: 641,918

[22] Filed: Jan. 16, 1991

[30] Foreign Application Priority Data

Jan. 24, 1990 [JP] Japan .................................. 2-12571

[51] Int. Cl.[5] .............................................. G03G 15/00

[52] U.S. Cl. ..................................... 355/213; 355/216

[58] Field of Search ............... 355/213, 216, 208, 210, 355/211

[56] References Cited

U.S. PATENT DOCUMENTS 4,097,138 6/1978 Kingsley ............................ 355/213

4,149,796 4/1979 Adachi et al. ...................... 355/213

OTHER PUBLICATIONS

*IBM Tech. Disc. Bull.*, vol. 18, No. 7, Dec. '75, pp. 2163, 2164.

*IBM Tech. Disc. Bull.*, vol. 17, No. 3, Aug. '74, pp. 672, 673.

*IBM Tech. Disc. Bull.*, vol. 12, No. 8, Jan. '70, pp. 1240, 1241.

*IBM Tech. Disc. Bull.*, vol. 18, No. 6, Nov. '75, pp. 1719, 1720.

*Primary Examiner*—R. L. Moses

*Attorney, Agent, or Firm*—Antonelli, Terry, Stout & Kraus

[57] ABSTRACT

An electrostatic recording apparatus includes a drum having an opening and a photosensitive sheet wound thereon. A cap seal member is provided at the opening and has a metal portion and a dielectric film formed on a part of the metal portion. The dielectric film has a relative permittivity in a range from substantially the same as that of toner to a value of 200.

25 Claims, 8 Drawing Sheets

ELECTROSTATIC RECORDING APPARATUS CAPABLE OF PREVENTING ADHESION OF EXCESSIVE TONER

BACKGROUND OF THE INVENTION

1. Field of the Invention

The present invention relates to an electrostatic recording apparatus. More particularly, the invention relates to the electrostatic recording apparatus which uses a photosensitive drum mainly including two portions, one portion having a photosensitive material on which a transfer image is formed and the other not having the material.

2. Description of the Related Art

In a conventional photosensitive recording apparatus of a photosensitive-sheet winding type, a cap seal is provided on an opening of a drum through which a photosensitive sheet is pulled out and wound around the drum. In order to prevent the surface of the cap seal from being developed while the cap seal is passing through under a developer, the electric potential of the cap seal is set to be substantially the ground potential, as is that of a supporting member for the drum. When biasing development is performed, no bias current flows through the developer to the supporting member through the photosensitive sheet, because the photosensitive sheet has a resistivity of about $10^9$ Ω·cm. However, since the cap seal is made of metal, the bias current flows through the developer to the supporting member through the cap seal, so that toner particles are adhered on the surface of the cap seal. This wastes toner and causes blurring of a charger and a cleaning brush used for cleaning the adhesive toner.

To overcome the foregoing shortcoming, U.S. Pat. No. 3,941,472 discloses a technique of treating the surface of a cap seal (having no photosensitive material) so that an insulating material having a volume resistivity of $10^9$ Ω·cm or more can be formed on the cap seal. The disclosed technique is concerned with an electric photographic copying machine of a normal development type. This technique of the surface treatment of the cap seal is employed to inhibit the flow of bias current into the cap seal, resulting in prevention of adhesion of toner. In the reference, there is a point in that the surface treatment makes it possible to provide a photosensitive drum having an electric resistivity of 1 to $5\times10^9$ Ω·cm, i.e., the cap seal has a higher electric resistance.

FIGS. 2 and 3A to 3C are views for describing the shortcomings to be overcome by the invention.

FIG. 2 shows an optical printer of a reversal development type which uses a OPC (organic photoconductor) photosensitive sheet 4. As shown, the photosensitive sheet 4 is pulled out of a stock roll 7 provided inside of a drum 3, wound around the drum 3, entered into the drum 3 again, and wound on a take-up roll 8. A cap seal 1 is made of a conductive material such as aluminum, insulated from the photosensitive sheet 4 and the drum 3, and is connected to ground through a parallel circuit composed of a capacitor 5 and a varistor 6. A scorotron charger 9 has a corona wire 10 and a grid 11, which are connected to a corona wire power source 12 and a grid power source 13. When the cap seal 1 passes under the charger 9, corona charge is stored in the capacitor 5 connected to the cap seal 1, so that the photosensitive drum is charged up to a minus voltage. The varistor 6 serves as a voltage adjusting element for keeping the charging potential of the capacitor at a predetermined value Vo, e.g., −700 V or less. The capacitor 5 and the varistor 6 are normally selected based on their characteristic values so that the predetermined value $V_o$ may be substantially equal to the charged potential of the photosensitive material.

An optical writing section 14 radiates a light pattern matching to a printing pattern on the drum 3 on which the photosensitive sheet 4 is wound, i.e., the photosensitive drum, resulting in forming an electrostatic latent image on the photosensitive sheet. Then, a toner image is formed on the photosensitive sheet from the latent image through bias development by a developer 15. The toner image is transferred to a paper sheet 16 by a transfer unit 17. The sheet 16 is stripped off the photosensitive drum under a stripping corotron 18 and the toner image is fixed on the sheet by a fixer 19. On the other hand, an erase lamp 20 discharges the residual charge on the photosensitive drum and a cleaning brush 21 cleans the photosensitive drum for the next printing process.

FIGS. 3A to 3C are views showing a surface potential distribution on the exposed photosensitive material and cap seal and adhering states of toner particles, respectively. As shown in FIG. 3A, the surface potential on the exposed photosensitive material drops from $V_o$ to $V_R$, while the surface potential on the cap seal substantially remains at an initial potential $V_o$. When the developer 15 carries out the bias development (bias voltage $V_B$:$V_R<V_B<V_o$), a toner image is formed on regions of the photosensitive material by toner particles 23 where the absolute value of the surface potential is smaller than $V_B$ and the toner image is not formed on the region where the surface potential does not drop because of no exposure.

However, though the surface potential on the cap seal is hardly changed and the absolute value of the surface potential is sufficiently higher than $V_B$, there is a phenomenon that toner particles 23 adhere on the surface of the cap seal.

FIG. 3B shows a state in which toner particles 23 are adhered on the cap seal 1. The toner particles adhere not only on the surface but also on the side of the cap seal. FIG. 3B shows the adhering state where the cap seal is made of aluminum. On the other hand, FIG. 3C shows the adhering state where the cap seal is made of an insulating material such as epoxy resin or Teflon resin. No toner particle adheres on the resin surface. However, when a metal tape 24 made of aluminum or the like is pasted on part of the cap seal 1 made of resin, the toner particles 23 adhere on the surface of the metal tape 24 even though the metal tape 24 itself is insulated. As a result, this phenomenon takes place like it does for the cap seal made of aluminum.

If the cap seal is made of a resin, that is, an insulating material, the corona charge is stored on the surface of the cap seal 1 when the cap seal passes under the charger 9, resulting in making the surface potential of the cap seal 1 close to a grid voltage $V_S$ ($\approx V_o$). Hence, the metal tape 24 provided on the surface of the resin cap seal 1 has a surface potential close to $V_S$ and the absolute value of the surface potential is far higher than that of the bias potential $V_B$ of the developer 15. Further, since the cap seal 1 itself is insulated, no bias current flows into the cap seal 1. Such a phenomenon cannot be overcome by the foregoing prior art (U.S. Pat. No. 3,941,472). It is thus necessary to elucidate the cause and take a suitable preventive measure.

SUMMARY OF THE INVENTION

It is therefore an object of the present invention to provide an electrostatic recording apparatus of a photosensitive-sheet winding type which can prevent toner particles from being adhered on a region having no photosensitive sheet like a cap seal portion.

It is another object of the present invention to provide an electrostatic recording apparatus which is designed to use the region having no photosensitive sheet as a reference potential portion for controlling the electric potential applied on the surface of the photosensitive material and adjusting a surface potential sensor.

To achieve the foregoing objects in a preferred mode, the electrostatic recording apparatus includes an opening, a drum having a photosensitive sheet wound around the drum, and a cap seal member provided at the opening and having a metal portion and a dielectric film formed on a part of the metal portion, said dielectric film having a relative permittivity ranging from the same value as the toner to a value of 200.

In the electrostatic recording apparatus of a photosensitive-sheet winding type, when charged toner particles are adhered on a metal portion having no photosensitive material such as the surface of the cap seal provided in the photosensitive drum, the toner particles serve to exert a large image force, thereby causing the toner particles to be adhered on the metal surface. By forming the dielectric film whose relative permittivity is 200 or lower on the metal surface, therefore, it is possible to weaken the image force exerted on the charged toner particles, thereby greatly reducing adhered toner particles.

By adjusting the volume resistivity of the dielectric film, it is possible to use the cap seal as a reference potential measuring section. If the electrostatic recording apparatus employs a normal developing type, it is necessary to make the electric potential applied on the surface of the cap seal far smaller than the bias voltage. In this case, by reducing the volume resistivity of the dielectric film, the leakage of charge is made possible, thereby preventing the charge from being increased on the cap seal surface. This results in achieving the foregoing objects.

DESCRIPTION OF THE PREFERRED EMBODIMENTS

Hereafter, the invention will be described with reference to the accompanying drawings.

At first, the description will be directed to the concept of the invention.

As a mechanism of adhesion of a toner particle on a conductive material, the magnitude of an image force applied to the toner particles by the image charge caused by the charge of the toner particle will be discussed below.

Figure 4A:
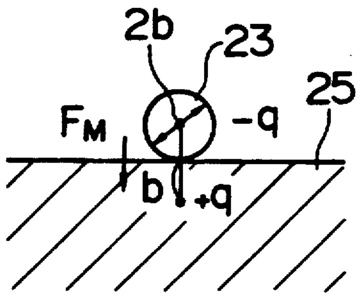
FIGS. 4A and 4B are views for describing image forces exerted on the toner particles.
Figure 4B:
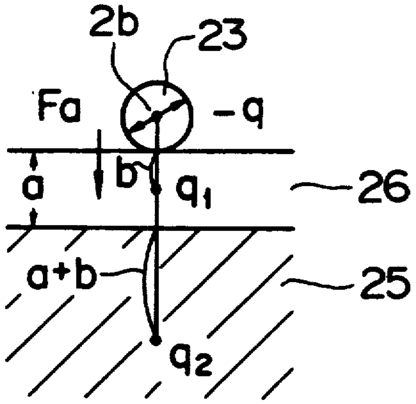

FIGS. 4A and 4B are views for describing the inventors' view about the image force applied to the toner particle. Both the figures indicate the image forces $F_M$ and $F_a$ applied to the toner particles where the toner particle 23 charged at $-q$ coulomb and having a radius of b and a relative permittivity $\epsilon_b$ is placed on the surface of a conductive material 25 (see FIG. 4A) and where the same toner particle 23 is placed on a dielectric film 26 formed on the conductive material 25, the dielectric film 26 having a thickness of a and a relative permittivity $\epsilon_a$ (see FIG. 4B).

[A case where the toner particle is placed on the conductive material (see FIG. 4A)]

Assuming that the image charge of $+q$ coulomb exists within the conductive material spaced from the surface of the conductive material by a distance b, the image force $F_M$ can be calculated as follows.

$$F_M = -\frac{q^2}{16\pi\epsilon_o\epsilon_b b^2} \quad (1)$$

[A case where the toner particle is placed on the dielectric film (see FIG. 4B)]

Assuming that the image charge of $+q1$ coulomb exists within the dielectric film spaced from the film surface by a distance of b and the image charge of $+q2$ coulomb exists within the conductive material spaced from the conductive material surface by a distance of $(a+b)$, q1 and q2 can be represented by $\epsilon_b$, $\epsilon_a$, b, a, and q, and the image force $F_a$ applied to the toner particle can be calculated as follows.

$$F_a = -\frac{q^2}{16\pi\epsilon_o}\left\{\frac{1}{(a+b)^2}\cdot\frac{\epsilon_b a + 2\epsilon_a b}{\epsilon_a\epsilon_b(a+2b)} + \frac{1}{b^2}\cdot\frac{\epsilon_a-\epsilon_b}{\epsilon_b(\epsilon_a+\epsilon_b)}\right\} \quad (2)$$

As is apparent from the equations (1) and (2), the image forces $F_M$ and $F_a$ depend only on the relative permittivity and the thickness of the dielectric material and the relative permittivity, the radius, and the charge amount of the toner particle.

Figure 2:
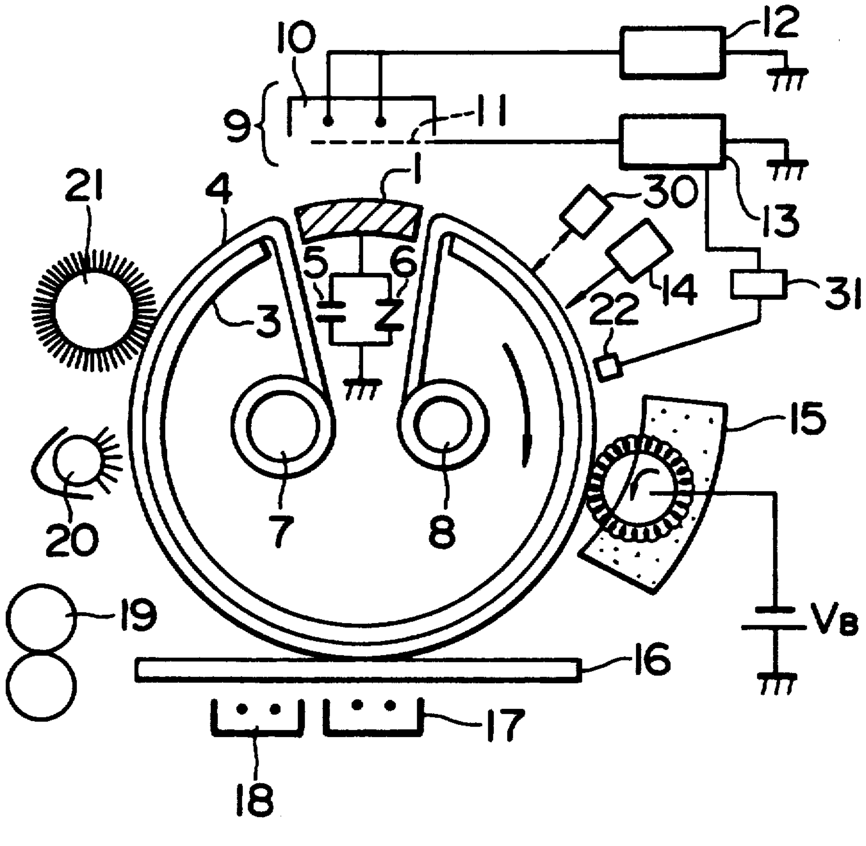
FIG. 2 is a view showing an electrostatic recording apparatus employing a photosensitive drum of a photosensitive-sheet winding type.
Figure 3A:
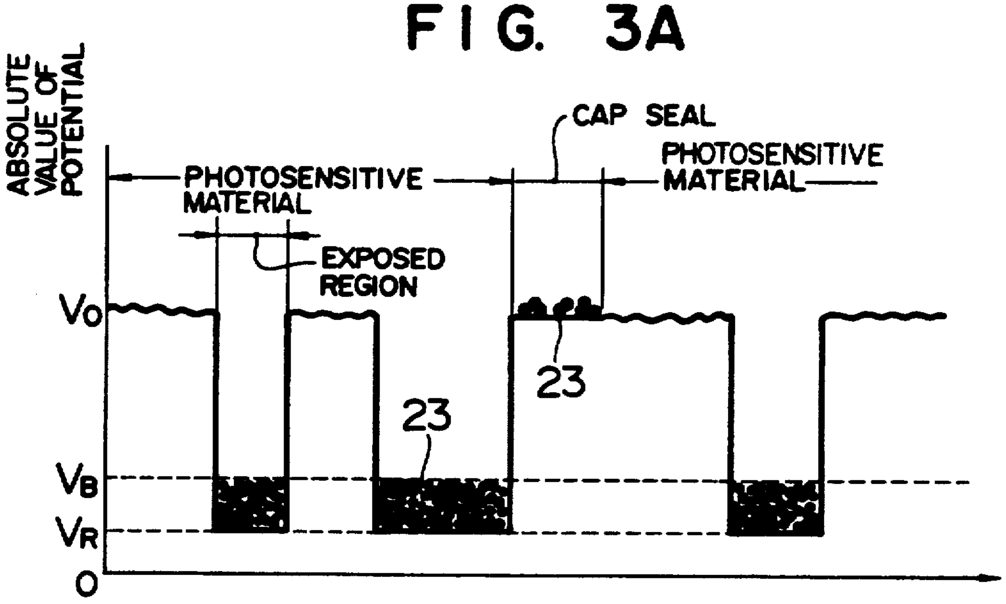
FIGS. 3A to 3C are views showing a surface potential distribution on the developed photosensitive drum and adhering states of toner particles.
Figure 3B:
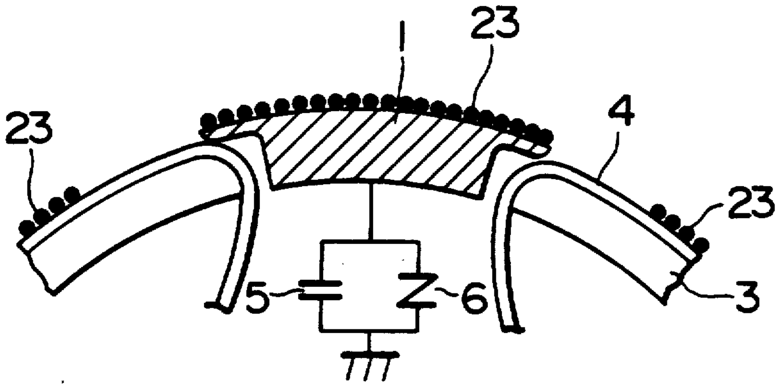
Figure 3C:
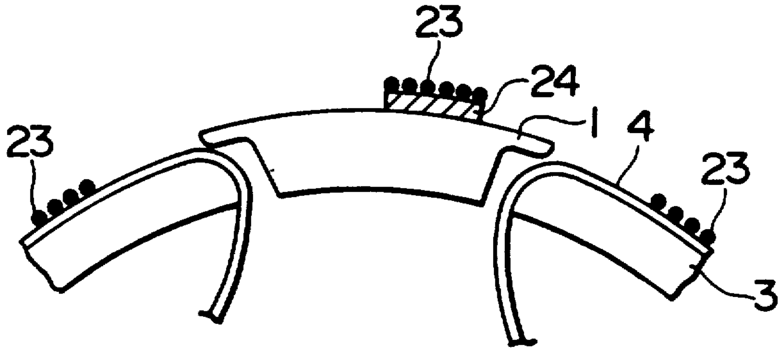
Figure 5:
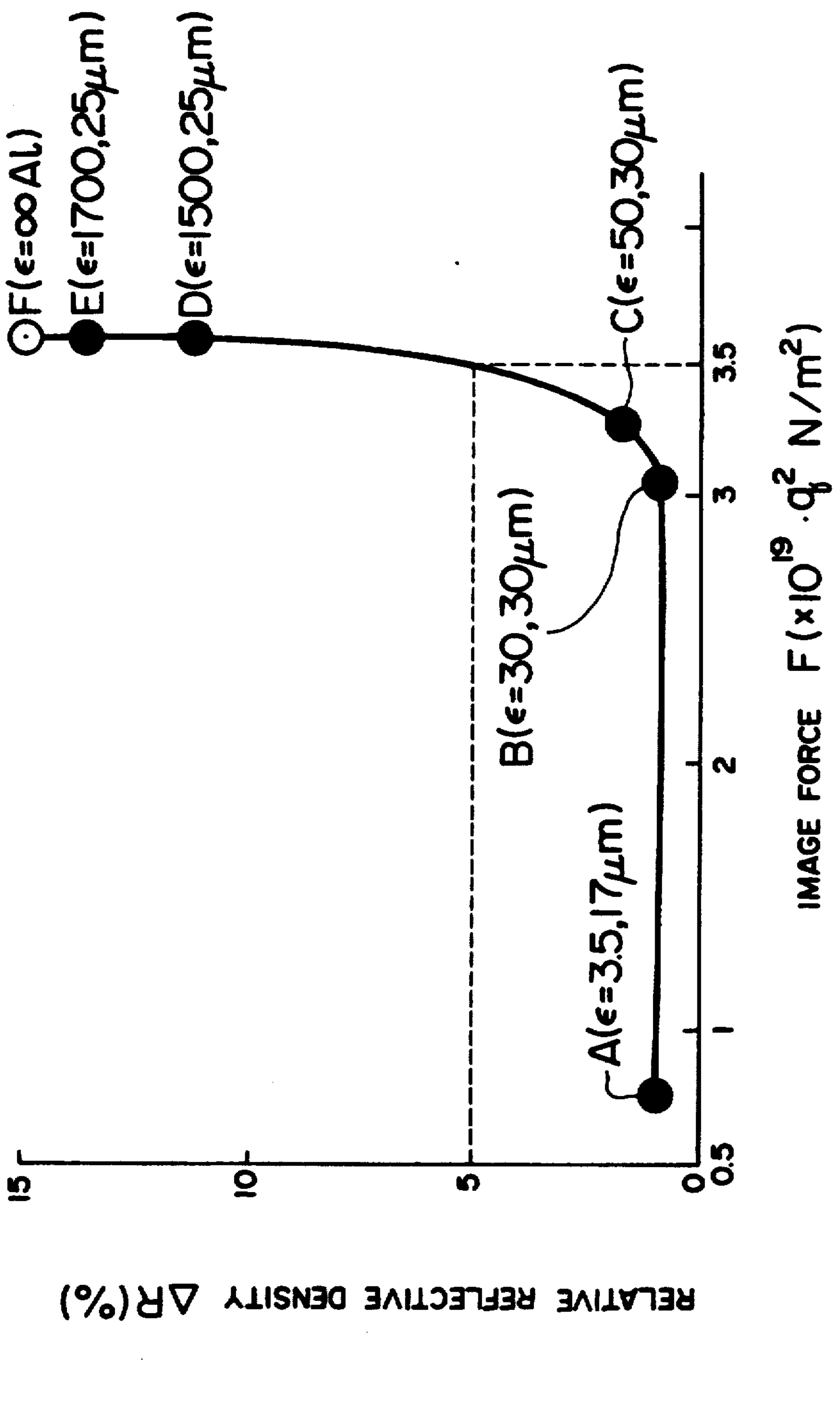
FIG. 5 is a view showing a relation between the image force exerted on the toner and the amount of the adhered toner.

FIG. 5 shows the relation between the amount of toner particles adhered on the surface of the cap seal and a calculated value of the image force exerted against each toner particle, the amount of the toner being estimated after the cap seal having the dielectric film formed thereon passes under the developer 15 in the electrostatic recording apparatus shown in FIG. 2.

For estimating the adhered toner amount, the toner particles adhered on the surface of the cap seal are transferred onto a tape, and the tape is pasted on a sheet so as to measure a reflective density. The relative reflective density ΔR due to contamination in FIG. 5 is defined as a difference of reflective density between the original tape and the tape after the toner has been transferred onto it.

In FIG. 5, A denotes contamination due to the toner in case of using an OPC photosensitive material and, B, C, D and E denote contamination for respective relative permitivities obtained by adjusting a composition ratio of aluminum enamel material used as the dielectric film. The relative permittivity of the material is measured by use of a dielectric bridge. Herein, there is indicated the relative permittivity at 10 Hz. It should be noted that an average charge amount of the toner particles used in the electrostatic recording apparatus such as a copying machine or a printer is $(1-3)\times10^{-14}$ (C), though the charge amount of one toner particle will be different from that of another toner particle because of a charging distribution or a radius distribution of the toner particles.

FIG. 5 indicates the following matters.

(1) As the relative permittivity becomes larger in the dielectric film, the image force exerted against the toner particle is made larger.

(2) When the image force is equal to or more than $3\times10^{19}$ $q^2$ ($N/m^2$), the amount of adhered toner particles is abruptly increased, where q is $(1-3)\times10^{-14}$ (C).

(3) When the relative reflective density ΔR due to contamination is 5% or more, adhesion of the toner on the cap seal surface causes a problem in practice. It occurs when the image force reaches about $3.5\times10^{19}$ $q^2$ ($N/m^2$).

Figure 8:
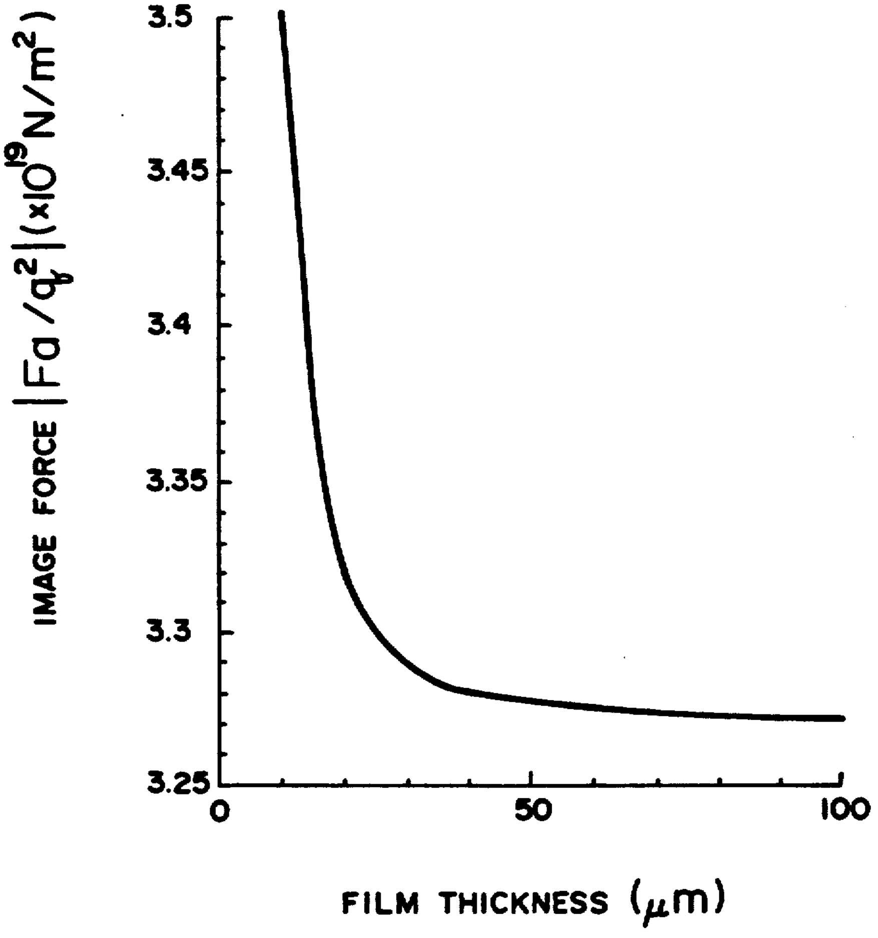
FIG. 8 is a view showing a relation between the dielectric film thickness and the image force.

FIG. 8 shows relation between a film thickness and the image force calculated with the equation (2) when a toner particle has a radius b of 5 μm and the relative permittivity $\epsilon_b$ of 2.5, and the dielectric film has a relative permittivity $\epsilon_a$ of 53. As is apparent from FIG. 8, as the film becomes thicker, the image force becomes smaller. In practice, it is desired that the film thickness is about 10 μm or more.

Figure 6:
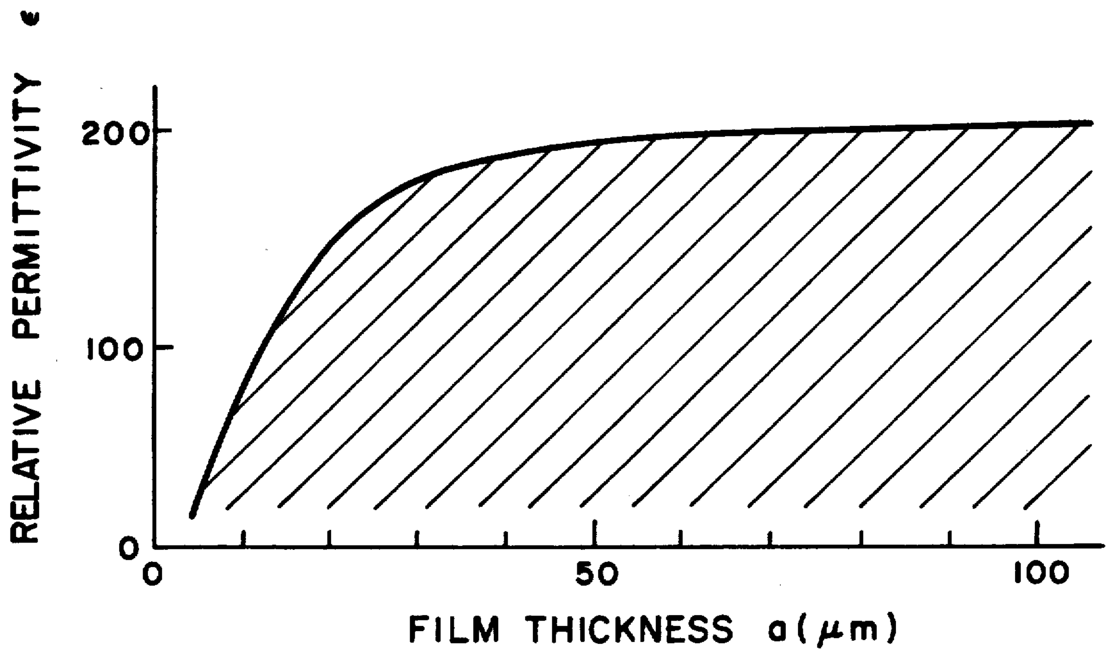
FIG. 6 is a view showing a relation between a thickness of a dielectric film effective in preventing adhesion of the toner and a relative permittivity.

The oblique-line portion of FIG. 6 shows a relation between the relative permittivity ε and the film thickness a of the dielectric film satisfying the image force $F\leqq3.5\times10^{19}$ $q^2$ ($N/m^2$). Herein, the relative permittivity ε is measured at 10 Hz. It is apparent from the figure that the relative permittivity ε does not need to be more than 200 when the film thickness is increased. That is, for preventing the adhesion of toner particles, it is only necessary to form the dielectric film having a relative permittivity of 200 or less on the conductive material, for example, the surface of the cap seal.

Hereafter, the description will be directed to an embodiment of the invention.

Figure 1:
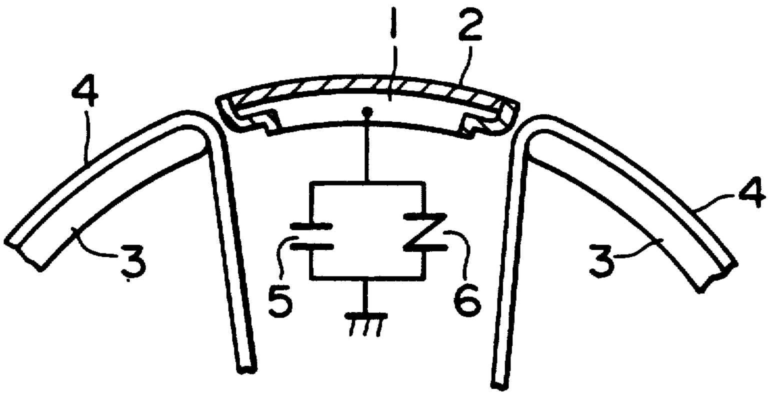
FIG. 1 is a view showing an embodiment of the invention.

At first, a cap-seal body made of aluminum (melting point: 620° C.) is manufactured by the extrusion molding method. The cap-seal body is heat-treated at about 560° C. and then a lead system aluminum enamel paste is uniformly coated on the top and the side surfaces of the cap-seal body. The aluminum enamel paste has a low melting point. The paste-coated body is sintered at 520° to 540° C., resulting in forming an aluminum enamel film whose thickness is 30 μm on the cap-seal body. As shown in FIG. 1, the aluminum enamel film 2 is a dielectric material having a relative permittivity of 53 and a volume resistivity of $10^7$ to $10^8$ Ω·cm. The cap seal is connected to a parallel circuit composed of a capacitor 5 having a capacitance of 0.01 μF and a varistor 6 having an operating voltage of 800 V (meaning the voltage across the varistor 6 when current of 1 mA flows through the varistor 6).

The aluminum enamel material contains a powder mixture of, for example, silica 24.1, red lead 37.0, soda ash 14.4, calcium carbonate 11.1, lithium carbonate 5.1, titanium oxide 8.3, and so forth. That is, the aluminum enamel contains six or more melt materials. Hence, the polarization at the surface between respective materials makes it possible to obtain a dielectric material whose a relative permittivity is apparently about 2000. In general, the material containing metals such as aluminum may be considered to have a relative permittivity of ∞.

FIG. 2 shows the construction of the electrostatic recording apparatus. In FIG. 2, a corona wire power source 12 is a constant power source (−2 mA). The OPC photosensitive sheet is charged by corona discharge from the power source 12. By changing a grid voltage $V_S$ of the grid power source 13 in accordance with control by a controller 31, the surface potential of the photosensitive material can be controlled to be −700 V. The construction and the operation of the electrostatic recording apparatus are detailed in the U.S. patent application Ser. No. 325,386 filed on Mar. 20, 1989, in which one of the inventors of the present invention is one of the inventors. This U.S. patent application is assigned to the present assignees. The disclosure of the U.S. patent application is herein incorporated by reference.

The aluminum enamel film is formed on the surface of the cap seal. If the volume resistivity ρ is kept as low as $10^7$ to $10^8$ Ω·cm, the capacitor 5 can be charged to −800 V when the cap seal passes under the charger 9. Thus, the proper selection of the position of a surface potential sensor 22 makes it possible to set the surface potential of the cap seal to −700 V±10 V and use the cap seal as a reference potential measuring section. A life of the photosensitive material can be estimated by comparing the surface potential of the cap seal with that of a non-exposed portion of the photosensitive material. The surface potential sensor is provided between an optical writing unit 14 and the developer 15, as shown in FIG. 2. This is because it is desired that the sensor is provided as near the developer 15 as possible to check developing performance of the photosensitive material. Further, this is also because the surface potential of the exposed region can be measured.

The developer 15 has a bias voltage $V_B$ of −400 V. After the cap seal passes the developer 15, the adhesion of the toner particles on the surface of the cap seal is estimated by the tape-stripping method described in FIG. 5. The estimated result indicates an excellent result, because the reflective density ΔR due to contamination is as small as 1.5% and is the same as that of a non-exposed portion (region not to be developed) of the OPC photosensitive material. Further, the cap seal has been brushed with the cleaning brush 21. However, such a frictional charge as adversely effecting the toner-cleaning function has hardly been generated.

Adding inorganic pigment to the aluminum enamel paste makes it possible to cause the color of the film coated on the cap seal to be a color such as yellow, blue, green and pink determined in accordance with the pigment. Herein, an optical sensor provided with a red LED (light-emitting diode) is used as a cap location sensor 30. To suit the red LED, enamel film having a blue color is employed so that the reflection of light emitted by the LED is higher on the surface of the cap seal and the sensitivity of the cap location sensor is improved.

As is obvious from the above description, as the image force is smaller, adhesion of the toner hardly occurs. Further, when the cap seal passes the developer 15, it contacts with a rolling developing roll. At this time, when the cap seal is charged with a polarity reverse to the toner particles because of contact of the cap seal with developing materials such as the toner and carriers, the toner easily adheres to the cap seal. Therefore, it is desired that the cap seal is charged with the same polarity as the toner, or the frictional electrification charge amount is as small as possible, even for the reverse polarity. Hence, it is desired that the dielectric film satisfies the following conditions for preventing adhesion of the toner.

(a) The relative permittivity $\epsilon_a$ of the film is close to or larger than the relative permittivity $\epsilon_b$ of the toner (that is, $\epsilon_a \approx \epsilon_b$).

(b) A work function of the film is close to that of the toner. In other words, friction between the film and the toner does not bring about charge of the film. A large amount of charge may enable the toner to adhere on the cap seal. The amount of frictional charge can be calculated as follows.

$$\sigma_c = e(W_t - W_c) \cdot K \text{[coulomb/m}^2\text{]}$$

where K is a coefficient, $W_t$ is a work function (eV) of the toner, and $W_c$ is a work function (eV) of the dielectric film. For instance, $W_t$ is 5.4 eV, $W_c$ of the aluminum enamel film is 5.4 eV, and $W_c$ of the alumite film is 5.1 eV. It indicates that the aluminium enamel film brings about smaller charges than the alumite film when the toner particles are rubbed on the film.

The embodiment described above employs an aluminum enamel material as the dielectric film. Yet, it may employ another enamel material such as titanium or zirconium. In addition, it may also employ a dielectric material whose relative permittivity is 200 or less such as Teflon resin, rubber, and synthetic resin.

Figure 9:
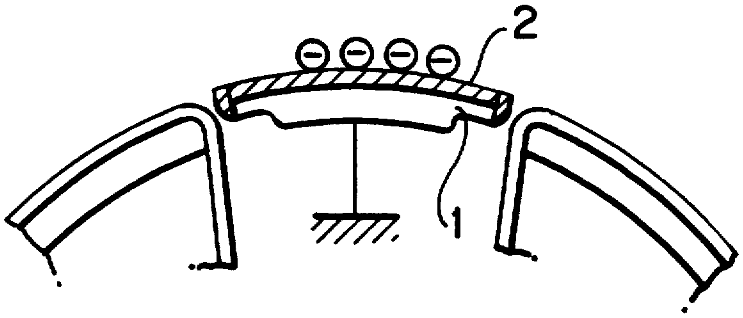
FIGS. 9 and 10 are views for describing a third embodiment of the invention.

FIG. 9 shows a cap seal used in a photosensitive-sheet winding drum which is employed in the electrostatic recording apparatus of a normal development type. The cap seal includes a base material 1 made of aluminum and an aluminum enamel film 2 formed on the surface of the base material 1 by the method described in the first embodiment. The aluminum enamel film is charged up by corona discharge from a charger as shown in FIG. 9. However, if the volume resistivity is small, the charges on the film leak off. Therefore, when the cap seal passes the developer 15, the electric potential of the cap seal is substantially the same as the ground potential. This means that the charges are not increased too much on the cap seal.

As shown in FIG. 2, on the other hand, when a system is employed in which the surface potential of the cap seal is set as a reference potential $V_K$, the surface potentials of the cap seal and the photosensitive material are measured by the surface potential sensor 22, the measured potential of the cap seal is compared with the measured surface potential $V_S$ of the photosensitive material, and the grid voltage of the charger 9 is controlled by the controller 31 to make both potentials equal to each other. In such a system, the important point is a charging characteristic of the capacitor 5 connected to the cap seal. That is, when the dielectric film 2 formed on the surface of the metallic material 1 has a large resistivity, the current flowing from the charger 9 into the cap seal is made smaller and the charging speed of the capacitor 5 is made smaller and charging time of the capacitor becomes longer. This prevents the capacitor 5 from being charged up to the reference potential (normally, about −700 V matching the charging potential of the photosensitive material). The life of the photosensitive material can be estimated from the above comparing result, and the controller 31 causes the take-up roll 8 to wind the photosensitive material.

Figure 7A:
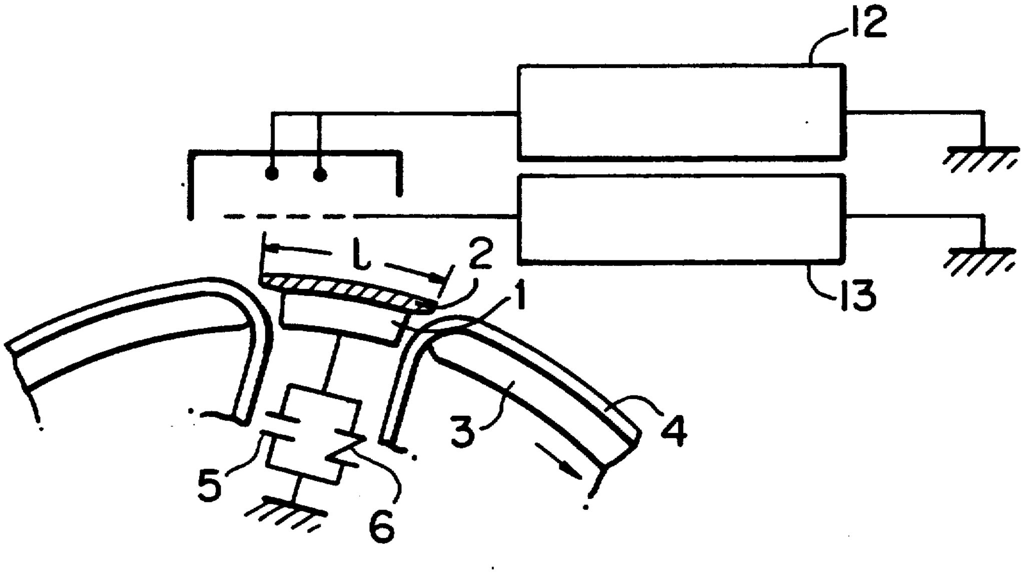
FIGS. 7A to 7C are views showing a second embodiment of the invention and relations between a surface potential of the cap seal and time and between the surface potential and a volume resistivity of the dielectric film.
Figure 7B:
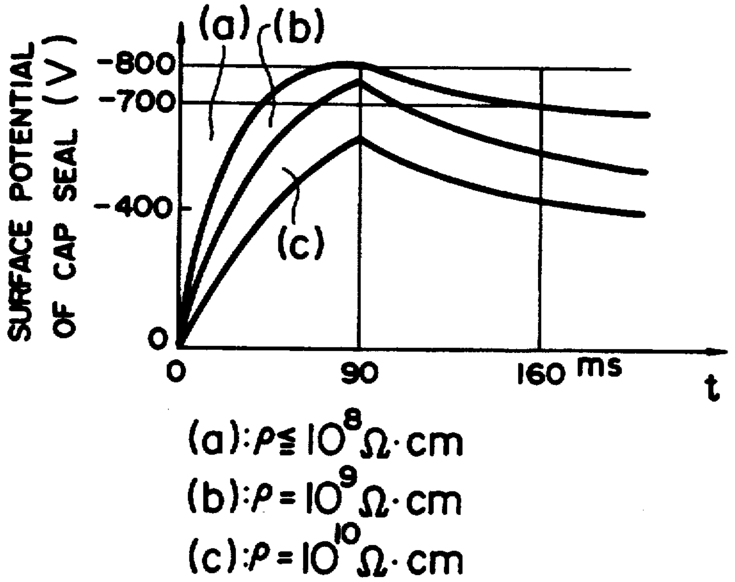
Figure 7C:
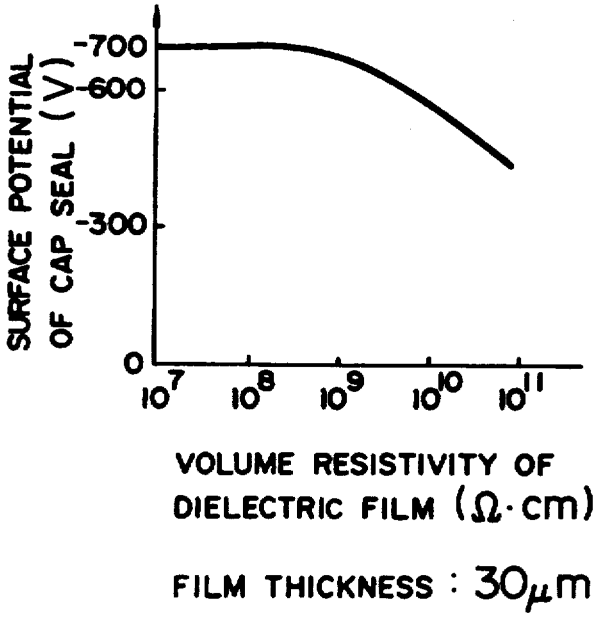

FIGS. 7A to 7C are graphs for describing how the charging is performed. As shown in FIG. 7A, the capacitor 5 has a capacitance of 0.2 μF and the varistor 6 has a varistor current of 1 mA when the voltage across the varistor, that is, the potential of the capacitor 5, is 800 V or more.

When the cap seal passes under the charger 9, the capacitor 5 starts to charge and keeps charging. When the cap seal passes out from under the charger 9, the capacitor 5 stops charging. FIG. 7B shows dependence of the surface potential of the cap seal on a volume resistivity $\rho$ as time passes. The cap seal is designed so that the width l is 4 cm, the depth is 40 cm, and the surface of the cap seal has a 30-μm dielectric film with a volume resistivity $\rho$. Assuming that the width of the charger 9 is 60 mm and the photosensitive drum moves at a speed of 686 mm/sec, the time for the cap seal to pass under the charger 9 is about 90 ms.

As is apparent from FIG. 7B, when the volume resistivity $\rho$ is $10^8$ Ω·cm or smaller, the surface of the cap seal is charged up to the operation voltage (800 V) of the varistor during a time of 60 ms. However, when the volume resistivity of the film is as large as $10^9$ to $10^{10}$ Ω·cm, the voltage across the capacitor 5 is not increased to 800 V.

When the cap seal passes out of the charger 9, the charge stored in the capacitor 5 is gradually decayed by a leak resistance of the varistor 6 or the like. FIG. 7B shows the surface potential of the cap seal surface, which potential is measured by the surface potential sensor 22 shown in FIG. 2. In case the volume resistivity $\rho$ takes a value of (b) $\rho = 10^9$ Ω·cm or (c) $\rho = 10^{10}$ Ω·cm, the voltage measured by the sensor 22 is smaller than 700 V by 100 V or more. Therefore, the surface potential of the cap seal thus cannot be used as a reference voltage. FIG. 7C shows a relation between the volume resistivity $\rho$ of the dielectric film and the surface potential of the cap seal. It is necessary to reduce the volume resistivity to a value of $10^9$ Ω·cm or less in order to use the cap seal as the reference voltage section for controlling the surface potential of the photosensitive material. The reduced volume resistivity allows the dielectric film to be thickened. It results in advantageously coping with the toner adhesion even if the printer operates at a faster printing speed.

Figure 10:
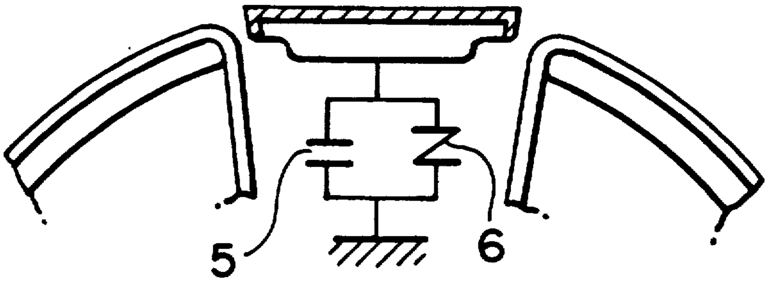

FIG. 10 is a view showing another embodiment having a different cap seal from the foregoing one. The cap seal has been conventionally curved like the cylinder supporting member. However, it is difficult to form the aluminum enamel film on the curved cap with a uniform thickness. For avoiding this difficulty, the cap seal is designed such that the surface of the cap seal is flat, as shown in FIG. 10 i.e., the cap seal surface does not have a curvature. This results in improving a coating characteristic of the film.

Though the foregoing embodiments have employed aluminum enamel materials as a dielectric film, $TiO_2$ (for which the relative permittivity is 86 and the volume resistivity is $10^8$ Ω·cm or less) or the like may be used.

The present invention has the following effects.

(1) It can greatly reduce the amount of toner adhered on the portion of the photosensitive drum having no photosensitive material, on which drum a transfer image is to be formed, e.g., the cap surface of the photosensitive drum of a photosensitive sheet winding type. Therefore, waste of toner and contamination of a transfer device, a stripping corotron, and a charger resulting from dispersion of toner particles adhered on the surface of the cap seal can be avoided.

(2) Since the dielectric film formed on the conductive cap seal surface has a low resistance, it is possible to rapidly charge the capacitor connected to the cap seal through the dielectric film when the cap seal passes under the charger. Therefore, by connecting the varistor in parallel to the capacitor, it is possible to set the surface voltage of the cap seal to the reference voltage, thereby allowing the surface voltage of the photosensitive material to be controlled.

(3) When the electrostatic recording apparatus is of a normal development type, it is necessary to set an absolute value of the surface voltage of the cap seal far lower than that of the bias voltage of the developer. On the surface of the cap seal is formed a dielectric film whose relative permittivity is 200 or less and volume resistivity is $10^9$ Ω·cm or less. Therefore, the image force applied to the toner particles can be reduced, thereby preventing toner adhesion on the surface of the cap seal. In addition, since the volume resistivity is low, the surface voltage applied on the cap seal does not rise due to increased charges.

(4) Since the color of the dielectric film formed on the cap seal surface can be freely changed, it is possible to enhance the sensitivity of an optical cap location sensor.

What is claimed is:

1. An electrostatic recording apparatus comprising:
   - a drum having an opening and including a photosensitive sheet wound around a portion of said drum excluding said opening; and
   - a cap seal member provided at said opening and including a metal portion and a dielectric film formed on a part of said metal portion, said dielectric film having a relative permittivity in a range from substantially the same as that of toner to a value of 200.

2. An electrostatic recording apparatus according to claim 1, wherein said dielectric film is an aluminum enamel film.

3. An electrostatic recording apparatus according to claim 1, wherein a surface of said metal portion is substantially flat and does not have a curvature.

4. An electrostatic recording apparatus according to claim 1, further comprising:
   - emitting means for emitting light to said drum, said drum being rotated, a surface of said cap seal member being of a predetermined color, said predetermined color having a reflectance in a wavelength region of the light emitted from said emitting means which differs from that in another wavelength region; and
   - means for sensing a change in light reflected by said drum to detect a position of said cap seal member.

5. An electrostatic recording apparatus according to claim 4, wherein the light from said emitting means has an intensity and a wavelength such that said photosensitive sheet does not sense the light, thereby preventing the toner from adhering to said photosensitive sheet in response to the light.

6. An electrostatic recording apparatus according to claim 1, wherein a work function of said dielectric film is substantially equal to that of the toner.

7. An electrostatic recording apparatus according to claim 1, wherein said dielectric film comprises one of Teflon resin, rubber, and synthetic resin.

8. An electrostatic recording apparatus according to claim 7, wherein said dielectric film has a volume resistivity such that charges on said dielectric film are able to leak through said dielectric film.

9. An electrostatic recording apparatus comprising:
   - a drum having an opening and including a photosensitive sheet wound around a portion of said drum excluding said opening;
   - a cap seal member provided at said opening and including a metal portion and a dielectric film formed on a part of said metal portion, said dielectric film having a relative permittivity in a range from substantially the same as that of toner to a value of 200;
   - biasing means, including a capacitor, connected between said cap seal member and a ground potential for biasing said cap seal member at a voltage to which said capacitor is charged; and
   - charging means for charging said capacitor and said photosensitive sheet, a time constant defined by a resistance of said dielectric film and a capacitance of said capacitor being selected such that said capacitor charges up to a predetermined voltage when said cap seal member passes under said charging means.

10. An electrostatic recording apparatus according to claim 9, wherein said dielectric film is an aluminum enamel film.

11. An electrostatic recording apparatus according to claim 9, wherein a surface of said metal portion is substantially flat and does not have a curvature.

12. An electrostatic recording apparatus according to claim 9, further comprising:
   - emitting means for emitting light to said drum, said drum being rotated, a surface of said cap seal member being of a predetermined color, said predetermined color having a reflectance in a wavelength region of the light emitted from said emitting means which differs from that in another wavelength region; and
   - means for sensing a change in light reflected from said drum to detect a position of said cap seal member.

13. An electrostatic recording apparatus according to claim 8, wherein the light from said emitting means has an intensity and a wavelength such that said photosensitive sheet does not sense the light, thereby preventing the toner from adhering to said photosensitive sheet in response to the light.

14. An electrostatic recording apparatus according to claim 9, wherein a work function of said dielectric film is substantially equal to that of the toner.

15. An electrostatic recording apparatus according to claim 9, wherein said dielectric film comprises one of Teflon resin, rubber, and synthetic resin.

16. An electrostatic recording apparatus according to claim 15, wherein said dielectric film has a volume resistivity such that charges on said dielectric film are able to leak through said dielectric film.

17. An electrostatic recording apparatus comprising:

a drum having an opening and including a photosensitive sheet wound around a portion of said drum excluding said opening;

a cap seal member provided at said opening and including a metal portion and a dielectric film formed on a part of said metal portion, said dielectric film having a relative permittivity in a range from substantially the same as that of toner to a value of 200;

biasing means, including a capacitor, connected between said cap seal member and a ground potential for biasing said cap seal member at a voltage to which said capacitor is charged; and charging means for charging said capacitor and said photosensitive sheet, a time constant defined by a resistance of said dielectric film and a capacitance of said capacitor being selected such that said capacitor charges up to a predetermined voltage when said cap seal member passes under said charging means;

measuring means for measuring a surface potential of said cap seal member as a reference potential and generating a control signal based on the reference potential, and for measuring a surface potential of said photosensitive sheet; and control means responsive to the control signal for controlling said charging means such that said charging means charges said photosensitive sheet up to a predetermined voltage.

18. An electrostatic recording apparatus according to claim 17, wherein said dielectric film is an aluminum enamel film.

19. An electrostatic recording apparatus according to claim 17, wherein a surface of said metal portion is substantially flat and does not have a curvature.

20. An electrostatic recording apparatus according to claim 17, further comprising:

emitting means for emitting light to said drum, said drum being rotated, a surface of said cap seal member being of a predetermined color, said predetermined color having a reflectance in a wavelength region of the light emitted from said emitting means which differs from that in another wavelength region; and means for sensing a change in light reflected from said drum to detect a position of said cap seal member.

21. An electrostatic recording apparatus according to claim 20, wherein the light from said emitting means has an intensity and a wavelength such that said photosensitive sheet does not sense the light, thereby preventing the toner from adhering to said photosensitive sheet in response to the light.

22. An electrostatic recording apparatus according to claim 17, wherein a work function of said dielectric film is substantially equal to that of the toner.

23. An electrostatic recording apparatus according to claim 17, wherein said control means includes means for comparing the measured surface potential of said photosensitive sheet with the reference potential to estimate a life of said photosensitive sheet.

24. An electrostatic recording apparatus according to claim 17, wherein said dielectric film comprises one of Teflon resin, rubber, and synthetic resin.

25. An electrostatic recording apparatus according to claim 24, wherein said dielectric film has a volume resistivity such that charges on said dielectric film are able to leak through said dielectric film.

* * * * *